US011904622B2

(12) United States Patent
Ishikawa et al.

(10) Patent No.: US 11,904,622 B2
(45) Date of Patent: Feb. 20, 2024

(54) PRINTING SYSTEM

(71) Applicant: TOSHIBA TEC KABUSHIKI KAISHA, Tokyo (JP)

(72) Inventors: Daisuke Ishikawa, Mishima Shizuoka (JP); Taishi Fukazawa, Chofu Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/884,610

(22) Filed: Aug. 10, 2022

(65) Prior Publication Data

US 2023/0073339 A1 Mar. 9, 2023

(30) Foreign Application Priority Data

Sep. 3, 2021 (JP) ................................. 2021-144008

(51) Int. Cl.
*B41M 7/00* (2006.01)

(52) U.S. Cl.
CPC ................................. *B41M 7/0009* (2013.01)

(58) Field of Classification Search
CPC . B41J 11/007; B41J 11/46; B41J 3/01; B41M 7/0009; B41M 5/282; B41M 7/00; B41M 7/009
See application file for complete search history.

(56) References Cited

U.S. PATENT DOCUMENTS 9,375,944 B2 * 6/2016 Yamamoto ................. B41J 2/32
10,438,100 B1 * 10/2019 O'Hagan ......... G06K 19/06056

FOREIGN PATENT DOCUMENTS

JP 2006-231647 9/2006
JP 2007-076768 3/2007
JP 6820628 1/2021

* cited by examiner

*Primary Examiner* — Kristal Feggins
(74) *Attorney, Agent, or Firm* — Amin, Turocy & Watson, LLP

(57) ABSTRACT

According to one embodiment, a position determination unit of a printing system determines a printing position of printing information printed on an object to be printed conveyed by a conveyance machine. An erasing unit erases the printing information printed using thermochromic ink by emitting heat from a heat source, a height position of which is adjusted according to the printing position, from a direction perpendicular to a conveyance direction according to a timing at which the printing position, determined based on the printing position, passes. A printing unit includes a printer using the thermochromic ink, disposed behind the heat source along the conveyance direction, and prints information on the object to be printed from the direction perpendicular to the conveyance direction by the printer, a height position of which is adjusted according to the printing position, according to the timing at which the printing position passes. A facing mechanism causes a printing surface of the object to be printed to face a printer head of the printer at least when the printing unit prints the information.

17 Claims, 13 Drawing Sheets

FIG. 7

| WRITING INFORMATION (DESTINATION, ...) |
|---|
| ○○ BUILDING ○ FLOOR ○○ DEPARTMENT, ... |
| ⋮ |
| XX FACTORY XX BUILDING XX FLOOR XX, ... |
| △△ BUILDING △ FLOOR △△ ROOM △△ TO WHOM, ... |
| ⋮ |

FIG. 8

| OBJECT ID | OBJECT INFORMATION (DATE AND TIME, DESTINATION, ...) |
|---|---|
| 1000001 | 2020.09.01 09:00:21, ○○ BUILDING ○ FLOOR ○○ DEPARTMENT, ... |
| ⋮ | ⋮ |
| 1000086 | 2020.09.01 09:39:45, XX FACTORY XX BUILDING XX FLOOR XX, ... |

*FIG. 12*

| SETTING ID | SIZE | PRINTING POSITION | ··· |
|---|---|---|---|
| 1001 | 145, 260, 145 | 50, 50 | ··· |
| 1002 | 175, 225, 145 | 60, 45 | ··· |
| 1003 | 255, 315, 175 | 100, 70 | ··· |
| ⋮ | ⋮ | ⋮ | ⋮ |

FIG. 16

| OBJECT ID | OBJECT INFORMATION (DATE AND TIME, DESTINATION, ...) | WRITING INFORMATION (DESTINATION, ...) |
|---|---|---|
| 1000087 | 2020.09.01 09:40:26, △△ BUILDING △ FLOOR △△ ROOM △△ TO WHOM, ... | ○○ BUILDING X FLOOR XX ROOM, ... |
| 1000001 | 2020.09.01 09:00:21, ○○ BUILDING ○ FLOOR ○○ DEPARTMENT, ... | △△ BUILDING ○ FLOOR ○X ROOM, ... |
| ... | ... | ... |

PRINTING SYSTEM

CROSS-REFERENCE TO RELATED APPLICATION

This application is based upon and claims the benefit of priority from Japanese Patent Application No. 2021-144008, filed on Sep. 3, 2021, the entire contents of which are incorporated herein by reference.

FIELD

Embodiments described herein relate generally to a printing system.

BACKGROUND

A printer using a thermochromic colorant is known. For example, printing information such as printing and handwriting formed on a printed material by using the thermochromic colorant by this printer can be erased by a device that heats up the entire area of the printed material. Alternatively, the printing information can also be erased by frictional heat generated by rubbing the printed material with a dedicated rubber provided at a rear end of a pen or a cap head portion.

For example, there is a situation in which objects to be printed such as a corrugated cardboard and a returnable box are conveyed one after another on a factory line, so a destination and the like should be printed on the objects to be printed. In such a situation, reuse of the object to be printed is considered from a viewpoint of saving resources. Therefore, there is a demand for developing a printing system in which an inkjet printer using the thermochromic colorant is used to efficiently erase old printing information already formed on a label of the object to be printed by using the thermochromic colorant, and then necessary information is printed thereon again by using the thermochromic colorant.

DESCRIPTION OF THE DRAWINGS

FIG. 7 is a diagram showing an example of writing information stored in a temporary storage unit in FIG. 6;

FIG. 8 is a diagram showing an example of object information stored in a database in FIG. 6;

FIG. 12 is a diagram showing an example of information stored in a table of the object to be printed in FIG. 11;

FIG. 16 is a diagram showing another example of the writing information stored in the temporary storage unit.

DETAILED DESCRIPTION

A problem to be solved by embodiments is to provide a printing system that can efficiently rewrite printing information of objects to be printed that are conveyed one after another.

In general, according to one embodiment, a printing system includes a conveyance machine, a position determination unit, an erasing unit, a printing unit, and a facing mechanism. The conveyance machine conveys an object to be printed. The position determination unit determines a printing position of printing information that is printed using thermochromic ink on the object to be printed conveyed by the conveyance machine. The erasing unit includes a heat source and erases the printing information that is printed using the thermochromic ink on the printing position by emitting heat from a heat source, a height position of which is adjusted according to the printing position, from a direction perpendicular to a conveyance direction of the object to be printed by the conveyance machine, according to a timing at which the printing position, determined based on the printing position, passes. The printing unit includes a printer using the thermochromic ink, disposed behind the heat source of the erasing unit along the conveyance direction, and prints information on the object to be printed from the direction perpendicular to the conveyance direction by the printer, a height position of which is adjusted according to the printing position, according to the timing at which the printing position, determined based on the printing position, passes. The facing mechanism causes a printing surface including the printing position of the object to be printed to face a printer head of the printer at least when the printing unit prints the information.

First Embodiment

Figure 1:
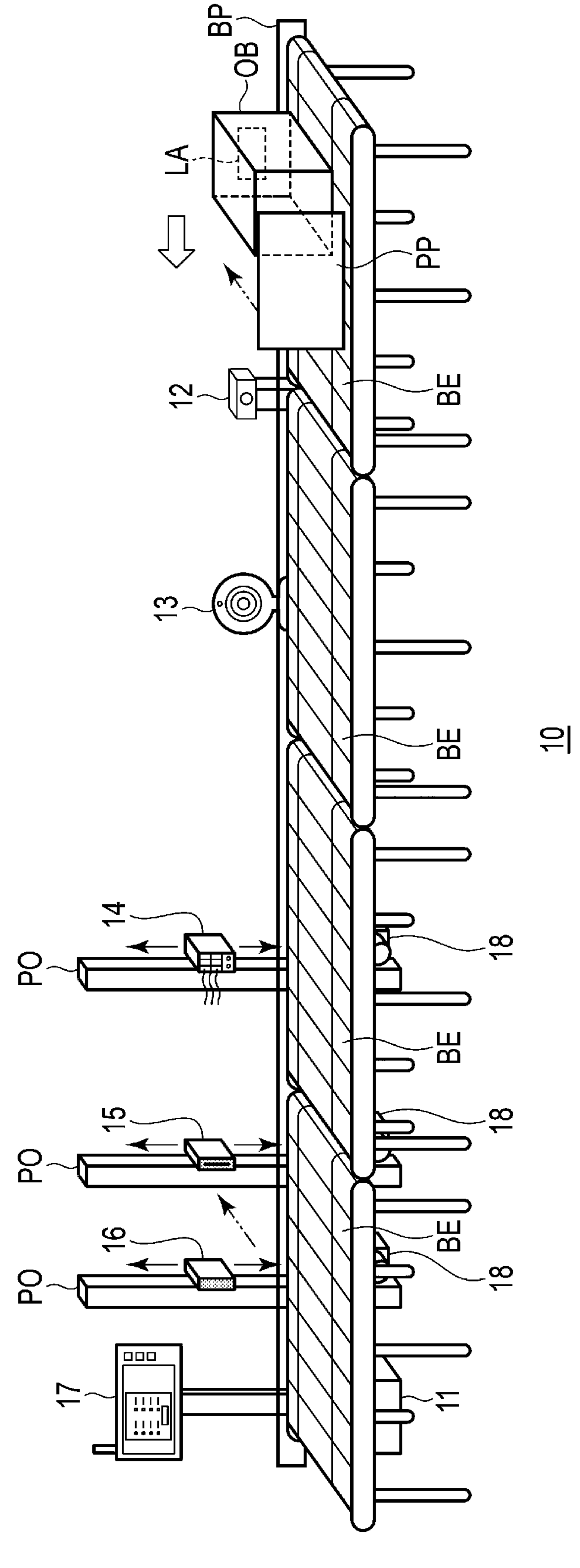
FIG. 1 is a perspective view showing a configuration example of a printing system according to a first embodiment.

FIG. 1 is a diagram showing a configuration example of a printing system 10 according to a first embodiment. The printing system 10 is a system for rewriting printing information in order to reuse an object to be printed OB on which the printing information is already printed by using thermochromic ink.

The printing system 10 includes a conveyance belt BE on which the object to be printed OB is placed. The printing information of the object to be printed OB is rewritten by moving the conveyance belt BE by a drive source which is not shown, and conveying the object to be printed OB placed thereon to a plurality of process positions for rewriting the printing information as shown by a hollow arrow in FIG. 1. The plurality of processes include an erasing process that emits heat to erase the printing information, a printing process that prints necessary information again by using the thermochromic ink, and a reading process that reads the printed printing information. As described above, the conveyance belt BE and the drive source, which is not shown, form a conveyance machine that conveys the object to be printed OB. While FIG. 1 shows four conveyance belts BE, the conveyance belt may be configured as one conveyance belt that covers all the process positions, or a plurality of conveyance belts other than four may be provided to cover all the process positions.

The object to be printed OB has a rectangular parallelepiped shape such as a corrugated cardboard and a returnable box, and a label LA having a color different from that of the object to be printed OB such as white is attached to one surface thereof. The printing information is printed on this label LA. In other words, the label LA is a printing position, and the surface to which the label LA is attached is a printing surface. The printing information includes a character string representing a destination of the object to be printed OB, that is, a destination of an article stored in the object to be printed OB, and at least a two-dimensional barcode such as a QR code (registered trademark) that encodes this character string. The object to be printed OB, in which the article is stored, is picked up by a worker or an appropriate pick-up mechanism, and the printing surface is placed on the conveyance belt BE toward a side of the conveyance belt BE, that is, toward a direction orthogonal to a conveyance direction of the object to be printed OB. Here, the label LA is printed with the printing information about a previously stored article, and is not printed with the printing information about a currently stored article, and as such, the label is required to be rewritten.

Figure 2:
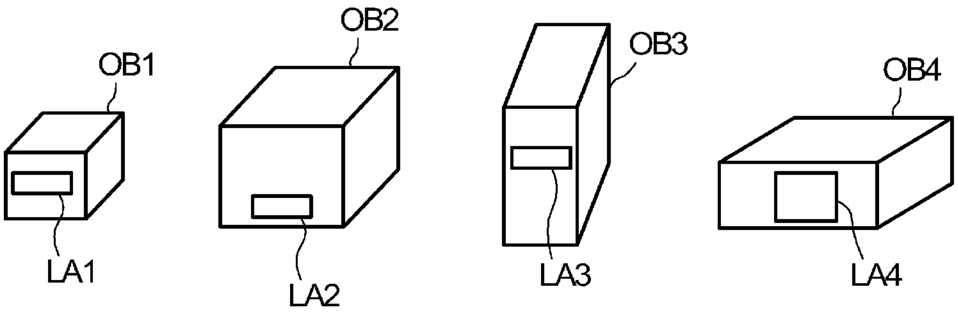
FIG. 2 is a diagram showing examples of various objects to be printed, which are to be used.

FIG. 2 is a diagram showing examples of various objects to be printed, which are to be used. Here, four objects to be printed OB1, OB2, OB3, and OB4 are shown. As described herein, the object to be printed OB may have a different ratio in size, height, width, and depth. The label LA (LA1, LA2, LA3, and LA4) can be attached to one side surface of each object to be printed OB, and the printing information can be printed thereon. A size and aspect ratio of each label LA may not be constant.

The printing system 10 further includes a control unit 11, a timing sensor 12, a label sensor 13, a heater 14, a printer 15, a barcode reader 16, a user interface 17, and three motors 18. The timing sensor 12, the label sensor 13, the heater 14 disposed at an erasing process position, the printer 15 disposed at a printing process position, the barcode reader 16 disposed at a reading process position, and the user interface 17 are disposed in this order along the conveyance belt BE. In other words, the erasing process position, the printing process position, and the reading process position are disposed in this order.

The control unit 11 is a computer that controls an operation of each component of the printing system 10.

The timing sensor 12 is formed of, for example, a photoelectric sensor, and detects that the object to be printed OB arrives at a position of the timing sensor 12. The control unit 11 can control an operation timing of the label sensor 13, the heater 14, the printer 15, and the barcode reader 16 based on a movement speed of the object to be printed OB by the conveyance belt BE, with reference to the time when the timing sensor 12 detects that the object to be printed OB arrives at the position thereof.

The label sensor 13 is formed of an image sensor such as a camera, and captures an image of the object to be printed OB. The control unit 11 can detect, by a well-known image process, the label LA, that is, the printing position in the object to be printed OB from the captured image of the object to be printed OB. That is, the control unit 11 detects, with respect to the printing position, a distance from a front end portion in the conveyance direction on the printing surface of the object to be printed OB, a distance from an upper end portion on the printing surface (a distance from a surface facing a placement surface), and a vertical and horizontal size. As the label sensor 13, a simple color area sensor that can detect the label LA by itself may be used. In this manner, the label sensor 13 and the control unit 11 form a printing position detection unit that detects the label LA on the conveyed object to be printed OB as a position determination unit that determines the printing position of the printing information being printed on the conveyed object to be printed OB by using the thermochromic ink.

The heater 14 is a heat source for erasing the thermochromic ink that irradiates the label LA with heat capable of erasing the printing information being printed on the label LA by using the thermochromic ink. The heater 14 is supported by a support column PO in a state of being able to move in a height direction by the motor 18 as shown by a solid arrow in FIG. 1. In the embodiment, a mechanism for converting a rotational force of the motor 18 into a movement force in a linear direction of the heater 14 is not particularly limited. A support mechanism for the support column PO may be adjusted to a conversion mechanism of this driving force. Any support mechanism may be used as long as the heater 14 can be supported so that a support direction thereof is in a direction in which the heat is emitted to the label LA from a direction perpendicular to the conveyance direction of the object to be printed OB, that is, from a side surface side in the conveyance direction. The control unit 11 can control the motor 18 and adjust a height position of the heater 14 to be matched with the printing position, based on the printing position determined by using the label sensor 13, that is, information indicating at what height of the object to be printed OB the label LA is attached. The control unit 11 operates the heater 14 at a timing when the printing position passes, which is calculated based on a detection time point by the timing sensor 12, thereby making it possible to erase the printing information printed by using the thermochromic ink. In this manner, the heater 14 and the control unit 11 form an erasing unit in which the heater 14, the height position of which is adjusted depending on the printing position, emits the heat from the direction perpendicular to the conveyance direction of the object to be printed OB according to the timing at which the printing position determined based on the printing position passes, and the printing information being printed using the thermochromic ink at the printing position is erased.

The printer 15 is formed of, for example, an inkjet printer using the thermochromic ink. The printer 15 is supported by the support column PO in a state of being able to move in the height direction by the motor 18 as shown by the solid arrow in FIG. 1. The conversion mechanism of the driving force of the motor 18 and a support mechanism of the printer 15 are not specified in the embodiment in the same manner as described in the case of the heater 14. The printer 15 is supported by the support column PO so as to print the printing information on the label LA from the direction perpendicular to the conveyance direction of the object to be printed OB, that is, from the side surface side in the conveyance direction. The control unit 11 can control the motor 18 and adjust a height position of the printer 15 to be matched with the printing position, based on the printing position determined by using the label sensor 13, that is, the information indicating at what height of the object to be printed OB the label LA is attached. The control unit 11 can print the printing information using the thermochromic ink by operating the printer 15 at the timing when the printing position passes, which is calculated based on the detection time point by the timing sensor 12. As described above, the printer 15 and the control unit 11 form a printing unit that includes the printer 15 using the thermochromic ink disposed behind the heater 14 along the conveyance direction, and that prints information on the object to be printed OB from the direction perpendicular to the conveyance direction by the printer 15, the height position of which is adjusted depending on the printing position, according to the timing at which the printing position determined based on the printing position passes.

The barcode reader 16 is supported by the support column PO in a state of being able to move in the height direction by the motor 18 as shown by the solid arrow in FIG. 1. The conversion mechanism of the driving force of the motor 18 and a support mechanism of the barcode reader 16 are also not specified in the embodiment. The barcode reader 16 is supported by the support column PO so as to read a barcode in the printing information printed on the label LA from the direction perpendicular to the conveyance direction of the object to be printed OB, that is, from the side surface side in the conveyance direction. The control unit 11 can control the motor 18 and adjust a height position of the barcode reader 16 to be matched with the printing position, based on the printing position determined by using the label sensor 13, that is, the information indicating at what height of the object to be printed OB the label LA is attached. The control unit 11 operates the barcode reader 16 at the timing when the printing position passes, which is calculated based on the detection time point by the timing sensor 12, thereby making it possible to read the barcode printed thereon and decode the printing information.

The user interface 17 is a system monitor for displaying various information from the control unit 11. The user interface 17 can include a key and a button for inputting various instructions to the control unit 11. The user interface 17 may include a touch panel on which touch keys are disposed on a monitor screen such as a liquid crystal display.

If an accurate operation is required in the erasing process, the printing process, and the reading process, the label LA, which is the printing position, is required to face the heater 14, the printer 15, and the barcode reader 16. Particularly, if the printer 15 does not face the printing surface, characters and images are distorted, and as such, it is difficult to distinguish the characters, or the barcode reader 16 cannot read the barcode. On the other hand, it is difficult to place the objects to be printed OB, which should be placed one after another, on the conveyance belt BE in the aligned direction.

Figure 3:
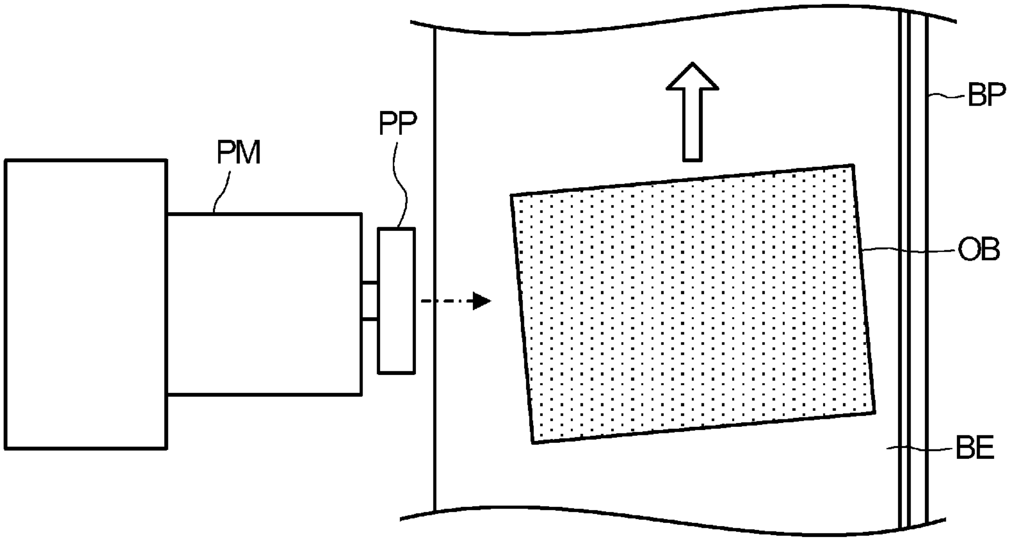
FIG. 3 is a schematic diagram showing a pre-operation state of a pressing plate that presses the object to be printed.
Figure 4:
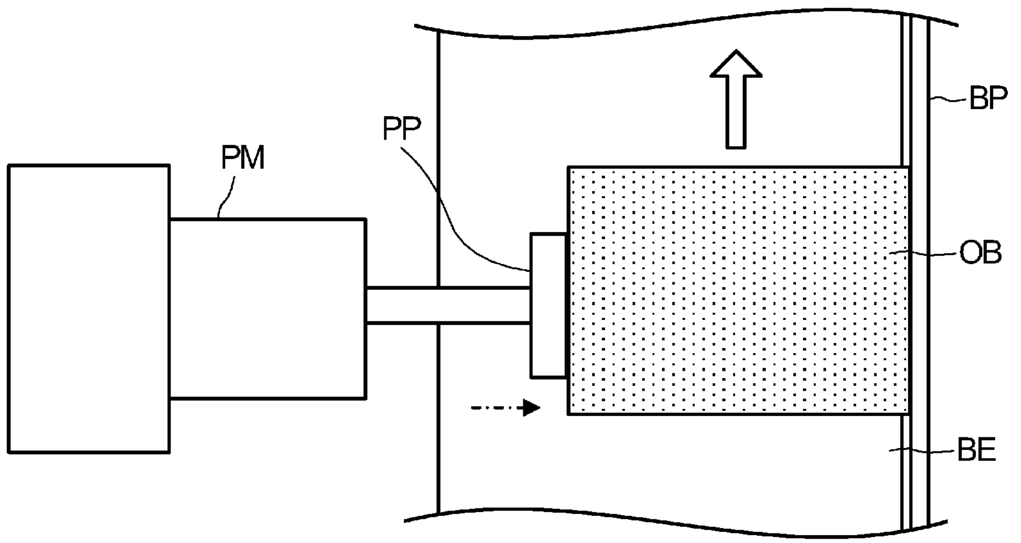
FIG. 4 is a schematic diagram showing a post-operation state of the pressing plate.

Therefore, the printing system 10 of the embodiment includes a butt plate BP and a pressing plate PP with the conveyance belt BE sandwiched between both sides thereof in the conveyance direction. The butt plate BP extends along the conveyance belt BE. FIG. 3 is a schematic diagram showing a pre-operation state of the pressing plate PP, and FIG. 4 is a schematic diagram showing a post-operation state of the pressing plate PP. The pressing plate PP is attached to a pressing mechanism PM and moves toward the butt plate BP by the pressing mechanism PM as shown by arrows having an alternate long and short dash line in FIGS. 1, 3, and 4. During this movement operation, the pressing plate PP abuts on the object to be printed OB conveyed by the conveyance belt BE, presses the object to be printed OB toward the butt plate BP, and causes the printing surface of the object to be printed OB to abut against the butt plate BP. As a result, the printing surface of the object to be printed OB is aligned in parallel with the conveyance direction, and is conveyed in this state. A contact surface of the butt plate BP that contacts the object to be printed OB is formed of a low friction material so as not to affect the conveyance of the object to be printed OB. A pressing force of the pressing plate PP by the pressing mechanism PM is also set to a value that does not affect a conveyance speed of the object to be printed OB. By adjusting the pressing force by feedbacking a repulsive force by the object to be printed OB, it may be possible to cope with a weight change of the object to be printed OB caused by a stored article. If the printing surface of the object to be printed OB abuts on the butt plate BP, the pressing plate PP is evacuated to an initial position thereof. For example, whether or not the printing surface of the object to be printed OB abuts on the butt plate BP can be detected as a change in repulsive force, or can be determined from an image taken by a camera.

An operation timing of the pressing plate PP is, for example, a timing in response to an operation instruction by a worker if the worker places the object to be printed OB on the conveyance belt BE. If the object to be printed OB is placed by a pickup mechanism, it is also possible for the control unit 11 to perform timing control based on a placement operation of the pickup mechanism.

In the example of FIG. 1, the butt plate BP is configured as a single plate, and may be configured with a plurality of consecutive plates. The butt plate BP may be disposed at least from an arrangement position of the pressing plate PP to the printing process position.

Figure 5:
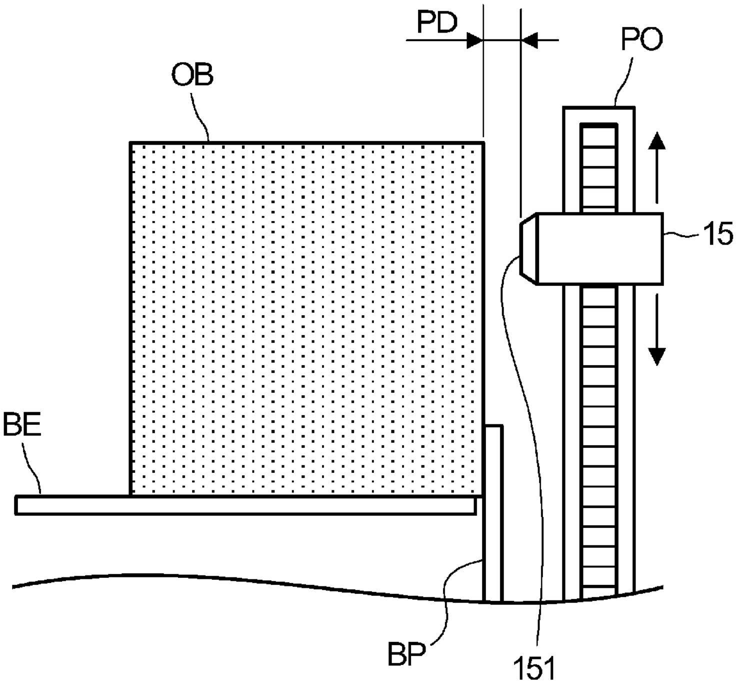
FIG. 5 is a schematic diagram showing a positional relationship between the object to be printed and a printer.

FIG. 5 is a schematic diagram showing a positional relationship between the object to be printed OB and the printer. If the object to be printed OB is conveyed to the printing process position, the printing surface provided with a printing area is parallel to the conveyance direction. The printer 15 is supported by the support column PO so that a printer head 151 that ejects ink droplets of the thermochromic ink is oriented in a direction perpendicular to the conveyance direction, in other words, a printing angle is perpendicular to the printing surface. Next, an installation position of the butt plate BP along the conveyance belt BE is determined so that a distance between the printing surface of the object to be printed OB and the printer head 151 becomes a specified distance PD suitable for printing the printing information. At other process positions as well, the butt plate BP can be installed so that a distance between the heater 14 and the barcode reader 16 and the printing surface of the object to be printed OB is set to a constant distance corresponding to the specified distance PD.

In this manner, the printing system 10 includes a facing mechanism that causes the printing surface including the printing position of the object to be printed OB to face the printer head 151 of the printer 15 at least when the printing unit prints the information. The facing mechanism includes the butt plate BP extending along the conveyance belt BE up to at least an installation position of the printer 15 and having a surface rising on the conveyance belt BE side at the specified distance PD from the printer head 151, and the pressing mechanism PM for pressing the object to be printed OB against the butt plate BP, which is disposed in front of the installation position of the printer 15 in the conveyance direction.

Figure 6:
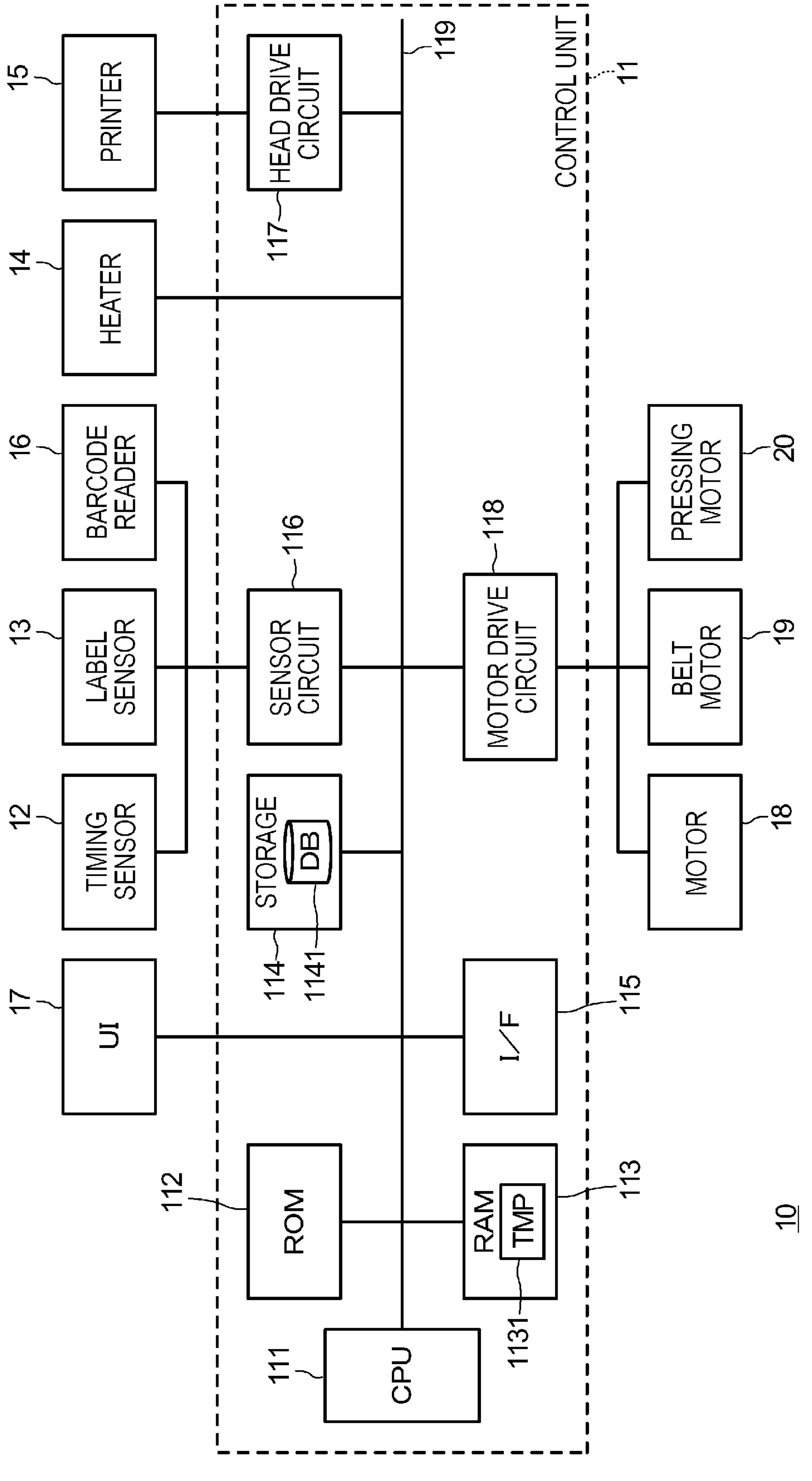
FIG. 6 is a block diagram showing an electrical configuration of the printing system.

FIG. 6 is a block diagram showing an electrical configuration of the printing system 10. The control unit 11 includes a CPU 111, a ROM 112, a RAM 113, a storage 114, an interface 115, a sensor circuit 116, a head drive circuit 117, and a motor drive circuit 118 connected to the CPU 111 via a bus 119. In FIG. 6, the "interface" is abbreviated as "I/F".

The CPU 111 is a processor having a function of controlling an overall operation of the printing system 10. The CPU

111 implements various functions by executing programs stored in advance in the ROM 112. The CPU 111 can execute a plurality of information processes at the same time by using multi-core and multi-threaded devices. Some of the various functions implemented by the CPU 111 executing the programs may be implemented by hardware circuits such as an application specific integrated circuit (ASIC), a field-programmable gate array (FPGA), and a graphics processing unit (GPU). In this case, the CPU 111 controls the functions executed by the hardware circuits.

The ROM 112 is a non-volatile memory in which a control program, control data, and the like are stored in advance.

The RAM 113 is a volatile memory. The RAM 113 temporarily stores data and the like being processed by the CPU 111. The RAM 113 may store data necessary for executing the program, an execution result of the program, and the like. For example, the RAM 113 can include a temporary storage unit 1131 that stores writing information to be written as the printing information. In FIG. 6, the "temporary storage unit" is referred to as "TMP".

The storage 114 is an auxiliary storage device such as an electric erasable programmable read-only memory (EEPROM) (registered trademark), a hard disc drive (HDD), and a solid state drive (SSD). The storage 114 non-volatilely stores data used by the CPU 111 for performing various processes and data generated by the processes of the CPU 111. The storage 114 includes, for example, a database 1141 that stores the printing information read by the barcode reader 16. In FIG. 6, the "database" is abbreviated as "DB".

The interface 115 is an interface for transmitting and receiving data to and from an external device via a network such as a LAN. The interface 115 may be an interface for reading and writing data to and from removable memory mediums such as a USB memory and a memory card.

The sensor circuit 116 is connected to the timing sensor 12, the label sensor 13, and the barcode reader 16. The sensor circuit 116 receives a signal or data therefrom and transmits the signal or the data to the CPU 111.

The head drive circuit 117 drives the printer head 151 of the printer 15, based on printing data according to the writing information stored in the temporary storage unit 1131 of the RAM 113, which is input from the CPU 111.

The motor drive circuit 118 controls the drive of the motor 18, a belt motor 19, and a pressing motor 20 according to a signal from the CPU 111. The motor drive circuit 118 can independently control the motor 18 for the heater 14, the motor 18 for the printer 15, and the motor 18 for the barcode reader 16. The belt motor 19 is a motor for driving the conveyance belt BE. Only one belt motor 19 is shown as a representative, and a plurality of belt motors 19 may be provided. The pressing motor 20 is a motor for the pressing mechanism PM that moves and operates the pressing plate PP. However, in a configuration in which an operation of the pressing mechanism PM is performed in response to an operation instruction by an operator, the pressing motor 20 is not required to be connected to the motor drive circuit 118.

The user interface 17 and the heater 14 can also be connected to the bus 119 directly or via an interface which is not shown and controlled by the CPU 111. In FIG. 6, the "user interface" is abbreviated as "UI".

FIG. 7 is a diagram showing an example of the writing information stored in the temporary storage unit 1131 of the RAM 113. As shown in FIG. 7, the temporary storage unit 1131 stores the writing information to be printed, as the printing information, on the printing position of the object to be printed OB, that is, on the label LA. The writing information includes, for example, a destination of the object to be printed OB. For example, a character input by a worker operation of the user interface 17 can be received as the writing information. After that, the writing information can be generated using the input character by the CPU 111, and stored in the temporary storage unit 1131. Alternatively, the CPU 111 controls the interface 115 to receive the writing information transmitted from the external device via the network or read the writing information being stored in the memory medium, thereby also making it possible to store the received or read writing information in the temporary storage unit 1131. The CPU 111 additionally stores new writing information at the end of the temporary storage unit 1131, and if the writing information initially stored therein is printed by the printer 15, the new writing information is deleted from the temporary storage unit 1131.

FIG. 8 is a diagram showing an example of object information stored in the database 1141 of the storage 114. The database 1141 stores, as the object information, contents of the printing information read by the barcode reader 16 in association with a unique object ID. The object ID is freely and selectively assigned by the CPU 111, and uses a serial number herein. The printing information includes a printing date and time in addition to the writing information, and as such, the object information also includes the printing date and time. The example of FIG. 8 shows a situation when a piece of printing information corresponding to a piece of writing information, in which a destination is "XX factory XX building XX floor XX", among the pieces of writing information of FIG. 7, is printed and read. That is, a piece of printing information corresponding to a piece of writing information, in which a destination is "ΔΔ building Δ floor ΔΔ room ΔΔ to whom", is not printed yet, or the printing information is printed but is not read yet, and as such, the object information corresponding to the writing information, in which the destination is "ΔΔ building Δ floor ΔΔ room ΔΔ to whom", is not yet stored in the database 1141.

Figure 9:
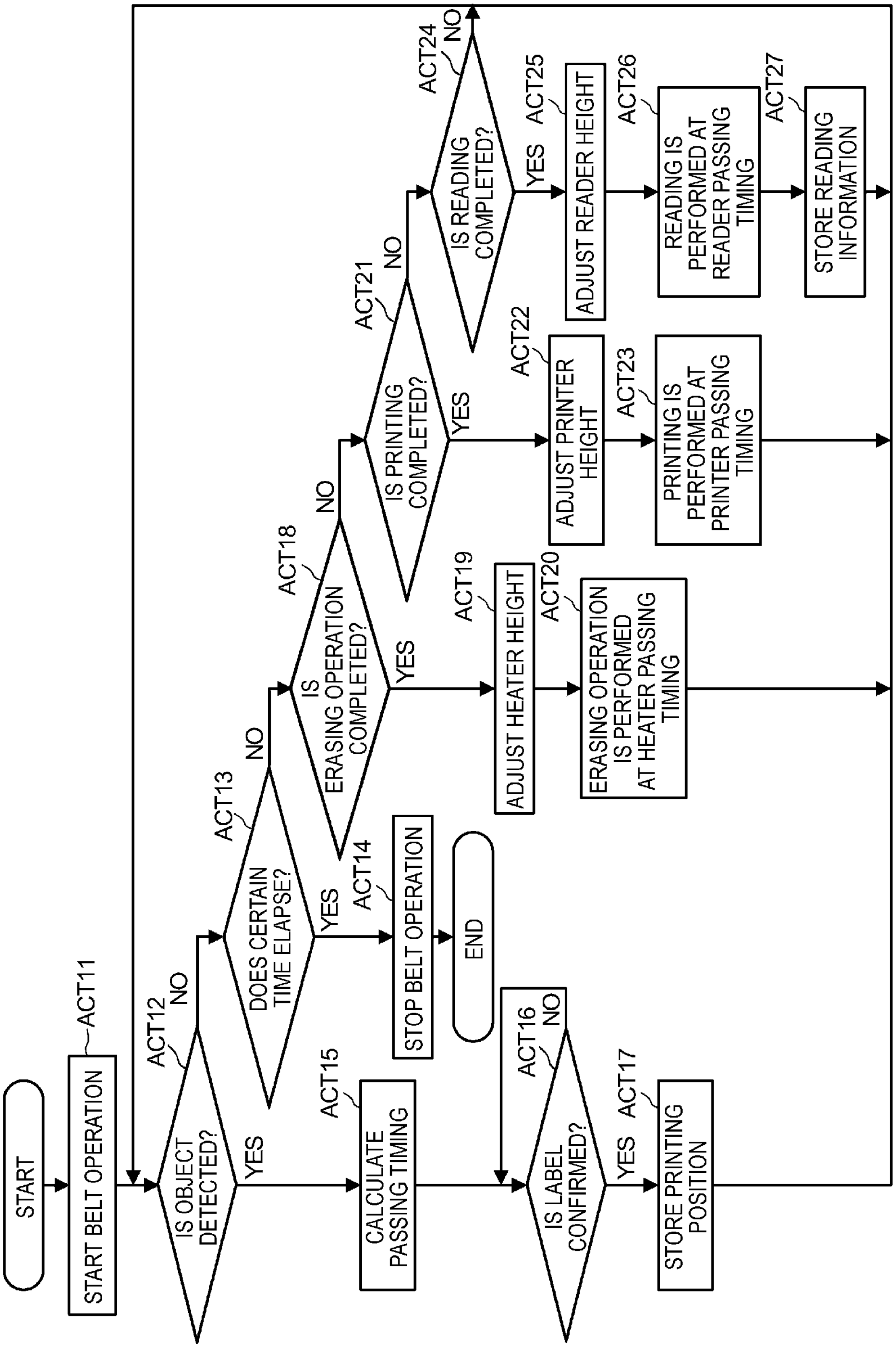
FIG. 9 is a flowchart showing an example of a control operation of a control unit in FIG. 6.

FIG. 9 is a flowchart showing an example of a control operation of the control unit 11. If the control unit 11 is started by turning on power, the CPU 111 displays an operation menu on the user interface 17 according to the program stored in the ROM 112, and executes the operation shown in this flowchart in response to a printing start operation in the user interface 17. In conjunction with the operation shown in this flowchart, the CPU 111 can execute an operation of storing the writing information input, received, and read by the user interface 17 or the interface 115 in the temporary storage unit 1131 of the RAM 113.

First, the CPU 111 controls the belt motor 19 by the motor drive circuit 118 to start an operation of the conveyance belt BE (ACT 11).

After that, the CPU 111 determines whether or not the timing sensor 12 detects the arrival of the object to be printed OB based on a signal from the sensor circuit 116 (ACT 12). When determining that the arrival of the object to be printed OB is not detected (ACT 12, NO), the CPU 111 determines whether or not a certain time elapses after detecting the arrival of the previous object to be printed OB (ACT 13). When determining that a certain period of time elapses (ACT 13, YES), the CPU 111 controls the belt motor 19 by the motor drive circuit 118 to stop the operation of the conveyance belt BE (ACT 14). Next, the CPU 111 ends the operation shown in this flowchart.

If the object to be printed OB is placed on the conveyance belt BE before the above-mentioned certain time elapses, the pressing plate PP is moved in response to the worker's instruction and the object to be printed OB is abutted against the butt plate BP. Alternatively, in response to reception of a placement signal from the pickup mechanism by the interface 115, the CPU 111 operates the pressing motor 20 by the motor drive circuit 118 to cause the object to be printed OB to be abutted against the butt plate BP.

If the object to be printed OB arrives at the timing sensor 12 while the printing surface thereof is in contact with the butt plate BP in this manner, the object to be printed OB is detected by the timing sensor 12. When determining that the timing sensor 12 detects the arrival of the object to be printed OB (ACT 12, YES), the CPU 111 calculates a passing timing at which the object to be printed OB passes through each process position of erasing, printing, and reading (ACT 15). For example, the process is performed as follows. First, the CPU 111 calculates a conveyance speed of the object to be printed OB by the conveyance belt BE based on a rotation speed of the belt motor 19, and stores the calculated conveyance speed in the RAM 113. The CPU 111 stores the time when the timing sensor 12 detects the arrival of the object to be printed OB in the RAM 113 in order to set the stored time as a reference time. Next, the CPU 111 reads out distances from the timing sensor 12 to the heater 14, the printer 15, and the barcode reader 16 in each process, which are stored non-volatilely in the ROM 112 or the storage 114, and calculates time from the timing when the object to be printed OB arrives at the timing sensor 12 to each of the process positions by dividing each distance by the conveyance speed thereof. The CPU 111 stores, in the RAM 113, the calculated passing timing at which the object to be printed OB passes through each of the process positions.

After that, the CPU 111 determines whether or not the label LA, that is, the printing position in the object to be printed OB is confirmed by a well-known image process from an image signal of the label sensor 13 input via the sensor circuit 116, or by a label detection signal of the label sensor 13 (ACT 16). The confirmation of the label LA herein does not simply indicate the detection of presence or absence of the label LA, but indicates the detection of the distance of the label LA from the front end portion in the conveyance direction on the printing surface of the object to be printed OB, the distance thereof from the upper end portion on the printing surface (the distance from the surface facing the placement surface), and the vertical and horizontal size thereof. When determining that the label LA cannot be confirmed (ACT 16, NO), the CPU 111 repeats the process of ACT 16.

When determining that the label LA is confirmed (ACT 16, YES), the CPU 111 stores the printing position, that is, the distance and size of the detected label LA in the RAM 113 (ACT 17). After that, the CPU 111 proceeds to the process of ACT 12.

When determining that the arrival of the object to be printed OB is detected, but a certain time does not elapse after the arrival of the previous object to be printed OB is detected (ACT 13, NO), the CPU 111 determines whether or not a previous erasing operation is completed (ACT 18). The previous erasing operation indicates an erasing operation for the object to be printed OB having a timing of arriving at the heater 14 among the objects to be printed OB that are conveyed one after another. That is, it is required to set the heater 14 at a height position corresponding to the label LA, that is, the printing position in each object to be printed OB, but the heater 14 should not be set at a height position corresponding to the next object to be printed OB before the erasing operation for the object to be printed OB arriving thereat is completed. Therefore, in ACT 18, it is required to confirm the end of the erasing operation.

When determining that the previous erasing operation is completed (ACT 18, YES), the CPU 111 reads the printing position of the object to be printed OB that will arrive at the heater 14 next from the RAM 113, and drives the motor 18 for the heater 14 by the motor drive circuit 118 to adjust a height of the heater 14 (ACT 19). Next, the CPU 111 reads out the passing timing of the object to be printed OB stored in the RAM 113, operates the heater 14 based on the timing at which the printing position thereof passes through the heater 14, and emits heat to the printing position to erase the printing information printed by using the thermochromic ink (ACT 20). After that, the CPU 111 proceeds to the process of ACT 12.

If the CPU 111 is a multi-core or multi-threaded CPU, it is possible to execute another process in parallel with the operation shown in this flowchart. Therefore, when determining that the previous erasing operation is completed (ACT 18, YES), the CPU 111 may start the processes of ACT 19 and ACT 20 as parallel processes with the operation of this flowchart, and may immediately proceed to the process of ACT 12.

When determining that the previous erasing operation is not completed (ACT 18, NO), the CPU 111 determines whether or not a previous printing operation is completed (ACT 21). The previous printing operation indicates a printing operation for the object to be printed OB having a timing of arriving at the printer 15 among the objects to be printed OB that are conveyed one after another. That is, it is required to set the printer 15 at a height position corresponding to the label LA, that is, the printing position in each object to be printed OB, but the printer 15 should not be set at a height position corresponding to the next object to be printed OB before the printing operation for the object to be printed OB arriving thereat is completed. Therefore, in ACT 21, it is required to confirm the end of the printing operation.

When determining that the previous printing operation is completed (ACT 21, YES), the CPU 111 reads the printing position of the object to be printed OB that will arrive at the printer 15 next from the RAM 113, and drives the motor 18 for the printer 15 by the motor drive circuit 118 to adjust a height of the printer 15 (ACT 22). Next, the CPU 111 reads out the passing timing of the object to be printed OB stored in the RAM 113, and causes the printer 15 to print the printing information by using the thermochromic ink at the printing position thereof based on the timing at which the printing position thereof passes through the printer 15 (ACT 23). That is, the CPU 111 reads out the writing information stored first therein among the pieces of writing information stored in the temporary storage unit 1131 of the RAM 113, generates printing data for printing the writing information as characters, and also generates printing data having a two-dimensional code representing a current date and time tracked by a clock which is not shown and the writing information. Next, the CPU 111 supplies the generated printing data to the head drive circuit 117, and further supplies a printing execution command at the timing when the printing position thereof passes through the printer 15. After that, the CPU 111 deletes the read writing information from the temporary storage unit 1131. The head drive circuit 117 drives the printer head 151 of the printer 15 based on the supplied printing data in response to the printing execution command, and prints the printing information on the label LA which is the printing position. After that, the CPU 111 proceeds to the process of ACT 12.

If the CPU 111 is the multi-core or multi-threaded CPU, and determines that the previous printing operation is completed (ACT 21, YES), the CPU 111 may start the processes of ACT 22 and ACT 23 as parallel processes with the operation of this flowchart, and immediately proceed to the process of ACT 12.

When determining that the previous printing operation is not completed (ACT 21, NO), the CPU 111 determines whether or not a previous reading operation is completed (ACT 24). The previous reading operation indicates a reading operation for the object to be printed OB having a timing of arriving at the barcode reader 16 among the objects to be printed OB that are conveyed one after another. That is, it is required to set the barcode reader 16 at a height position corresponding to the label LA, that is, the printing position in each object to be printed OB, but the barcode reader 16 should not be set at a height position corresponding to the next object to be printed OB before the reading operation for the object to be printed OB arriving thereat is completed. Therefore, in ACT 24, it is required to confirm the end of the reading operation.

When determining that the previous reading operation is completed (ACT 24, YES), the CPU 111 reads the printing position of the object to be printed OB that will arrive at the barcode reader 16 next from the RAM 113, and drives the motor 18 for the barcode reader 16 by the motor drive circuit 118 to adjust a height of the barcode reader 16 (ACT 25). Next, the CPU 111 reads out the passing timing of the object to be printed OB stored in the RAM 113, and causes the barcode reader 16 to read the two-dimensional code in the printing information via the sensor circuit 116 based on the timing at which the printing position thereof passes through the barcode reader 16 (ACT 26). The CPU 111 decodes the read two-dimensional code to acquire the printing date and time and the writing information such as the destination, associates the acquired information with a newly issued object ID, and stores the information associated therewith in the database 1141 of the storage 114 as object information (ACT 27). After that, the CPU 111 proceeds to the process of ACT 12.

If the CPU 111 is the multi-core or multi-threaded CPU, and determines that the previous reading operation is completed (ACT 24, YES), the CPU 111 may start the processes of ACT 25 to ACT 27 as parallel processes with the operation of this flowchart, and immediately proceed to the process of ACT 12.

When determining that the previous reading operation is not completed (ACT 24, NO), the CPU 111 proceeds to the process of ACT 12.

As described above, the printing system 10 according to the embodiment erases the printing information printed using the thermochromic ink at the printing position by allowing the heater 14, the height position of which is adjusted depending on the printing position, to emit the heat from the direction perpendicular to the conveyance direction of the object to be printed OB according to the timing at which the printing position, which is determined based on the printing position of the printing information in the object to be printed OB conveyed by the conveyance belt BE, passes. The printing system 10 includes the printer 15 using the thermochromic ink disposed behind the heater 14 along the conveyance direction, and causes the printer 15, the height position of which is adjusted depending on the printing position, to print the information on the object to be printed OB from the direction perpendicular to the conveyance direction according to the timing at which the printing position, which is determined based on the printing position, passes. The printing system 10 causes the printing surface including the printing position of the object to be printed OB to face the printer head 151 of the printer 15 at least when the printer 15 prints the information.

Accordingly, it is possible to provide the printing system 10 that can efficiently rewrite the printing information of the objects to be printed OB that are conveyed one after another.

In the embodiment, the printing system 10 detects the printing position on the object to be printed OB conveyed by the conveyance belt BE by using the label sensor 13.

Therefore, even though the printing information is printed on the label LA attached to the object to be printed OB having various sizes at various positions, it is possible to determine the printing position by simply detecting the label LA.

In the embodiment, the printer head 151 of the printer 15 is provided so as to face the direction perpendicular to the conveyance direction. As the facing mechanism that causes the printing surface of the object to be printed OB to face the printer head 151, the printing system 10 includes: the butt plate BP extending along the conveyance belt BE up to at least the installation position of the printer 15 and having the surface rising on the conveyance belt BE side at the specified distance from the printer head 151; and the pressing mechanism including the pressing plate PP for pressing the object to be printed OB against the butt plate BP, which is disposed in front of the installation position of the printer 15 in the conveyance direction.

Therefore, it is possible to surely cause the printing surface of the object to be printed OB to face the printer head 151.

In the embodiment, the timing at which the printing position passes through the heater 14 and the printer 15 is calculated based on the point of time when the timing sensor 12 disposed in front of the installation position of the heater 14 in the conveyance direction detects the arrival of the object to be printed OB, and the pressing plate PP is disposed in front of the timing sensor 12 in the conveyance direction.

Therefore, since the posture of the object to be printed OB can be made the same if the object to be printed OB arrives at the timing sensor 12 and if the object to be printed OB arrives at the printer 15, it is possible to prevent the occurrence of timing deviation.

In the embodiment, the printing system 10 includes the barcode reader 16 that reads the information printed by the printer 15 from the object to be printed OB, and the database 1141 that records the information read by the barcode reader 16.

Therefore, by using the information recorded in the database 1141, various management including destination management can be performed for the object to be printed OB, the printing of which is completed.

Second Embodiment

Next, a second embodiment will be described. The description of the same configuration and operation as those of the first embodiment described above will be omitted by using the same reference numerals as those of the first embodiment. Hereinafter, the parts different from those of the first embodiment will be described.

Figure 10:
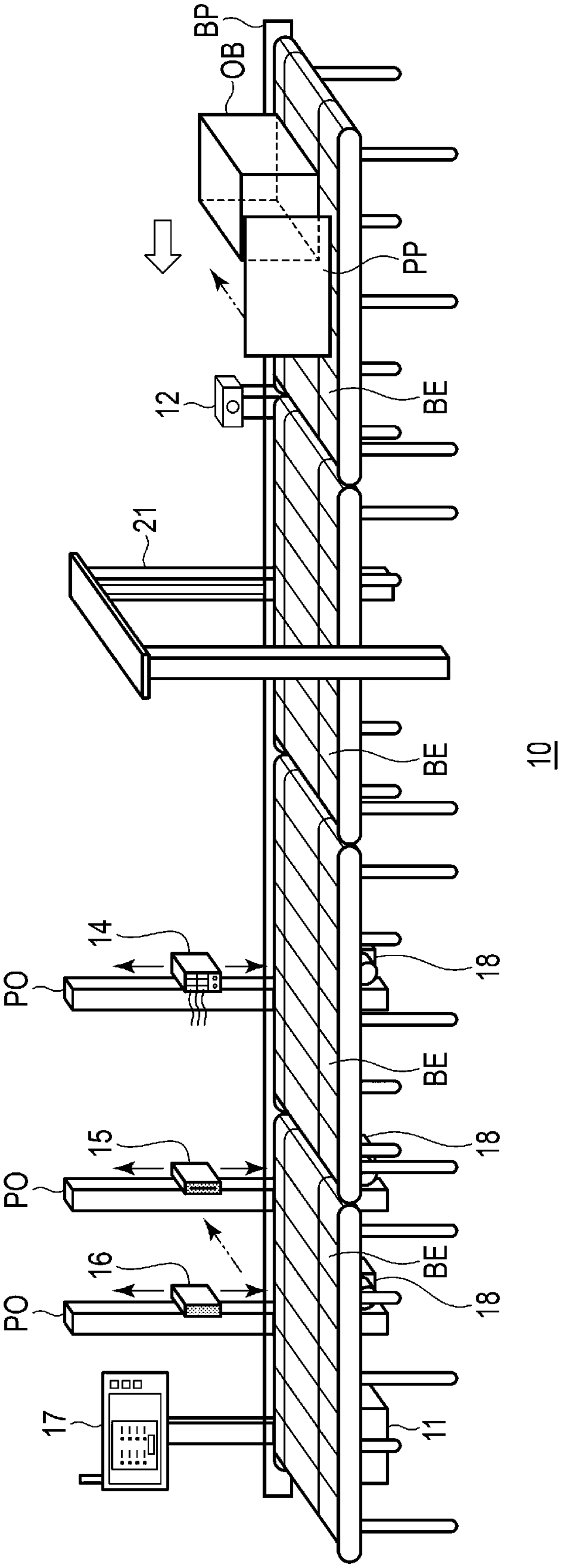
FIG. 10 is a perspective view showing a configuration example of a printing system according to a second embodiment.
Figure 11:
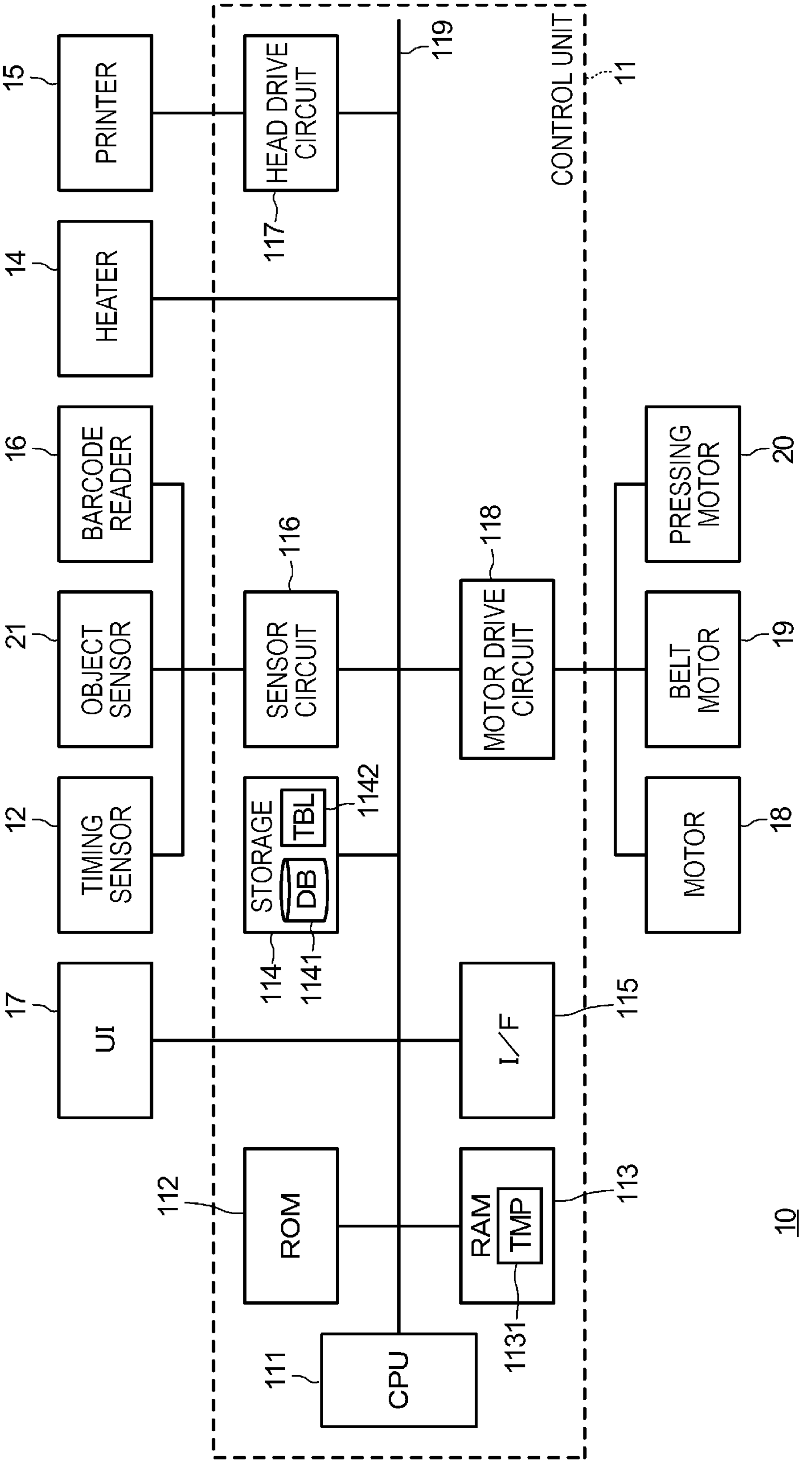
FIG. 11 is a block configuration diagram of the printing system.

FIG. 10 is a perspective view showing a configuration example of the printing system 10 according to the second embodiment. In the embodiment, in the printing system 10, an object sensor 21 is disposed instead of the label sensor 13 in the first embodiment. FIG. 11 is a block configuration diagram of the printing system according to the second embodiment. In the embodiment, the printing system 10 connects the object sensor 21 instead of the label sensor 13 in the first embodiment to the sensor circuit 116 of the control unit 11. In addition to the database 1141, the storage 114 stores a table of the object to be printed 1142 in which printing positions in the objects to be printed OB having various sizes are described. In FIG. 11, the "table of the object to be printed" is abbreviated as "TBL".

The object sensor 21 includes a photoelectric sensor row disposed perpendicular to the conveyance belt BE and a photoelectric sensor row disposed horizontally with respect to the conveyance belt BE and perpendicular to the conveyance direction, and detects the presence or absence of the object to be printed OB conveyed by the conveyance belt BE. The CPU 111 can confirm a height of the object to be printed OB, that is, a height size of the printing surface, based on a detection result of the photoelectric sensor row disposed perpendicular to the conveyance belt BE of the object sensor 21. The CPU 111 can confirm a width of the object to be printed OB in the conveyance direction, that is, a width size of the printing surface, based on the detection result of this photoelectric sensor row and a conveyance speed of the conveyance belt BE. The CPU 111 can confirm a depth size of the object to be printed OB, based on a detection result of the photoelectric sensor row disposed horizontally with respect to the conveyance belt BE of the object sensor 21 and perpendicular to the conveyance direction.

As the object sensor 21, a camera may be used instead of the photoelectric sensor row, or a time of flight (ToF) sensor may be used. By using the ToF sensor, it is possible to determine a size of the object to be printed OB based on a distance.

The second embodiment shows an example in which the label LA is not attached to the object to be printed OB and the printing information is directly printed on the printing surface. If the label LA is not used, it is not easy to detect the printing position. Therefore, in this embodiment, the printing position on the printing surface is defined for each size of the object to be printed OB.

FIG. 12 is a diagram showing an example of information stored in the table of the object to be printed 1142. In the table of the object to be printed 1142, the size and printing position of the object to be printed OB are described in association with a unique setting ID. A unit is cm. In this example, the sizes of the object to be printed OB are described in the order of a width of the printing surface, a height of the printing surface, and a depth of the object to be printed OB. In this example, the printing positions are described in the order of a position from an end portion of the printing surface in the conveyance direction and a position from an upper end portion of the printing surface. Of course, the description order of these sizes and printing positions is not limited to this order.

For example, the size and the printing position are acquired by allowing the CPU 111 to receive in advance an input by an operator operation of the user interface 17, or acquired from an external device or a memory medium by the interface 115. Thereafter, the acquired size and printing position are freely assigned a setting ID and registered in the table of the object to be printed 1142. The setting ID is a serial number here. If the object to be printed OB, the size of which is not registered in the table of the object to be printed 1142, is conveyed, the size and the printing position can be added each time.

Figure 13:
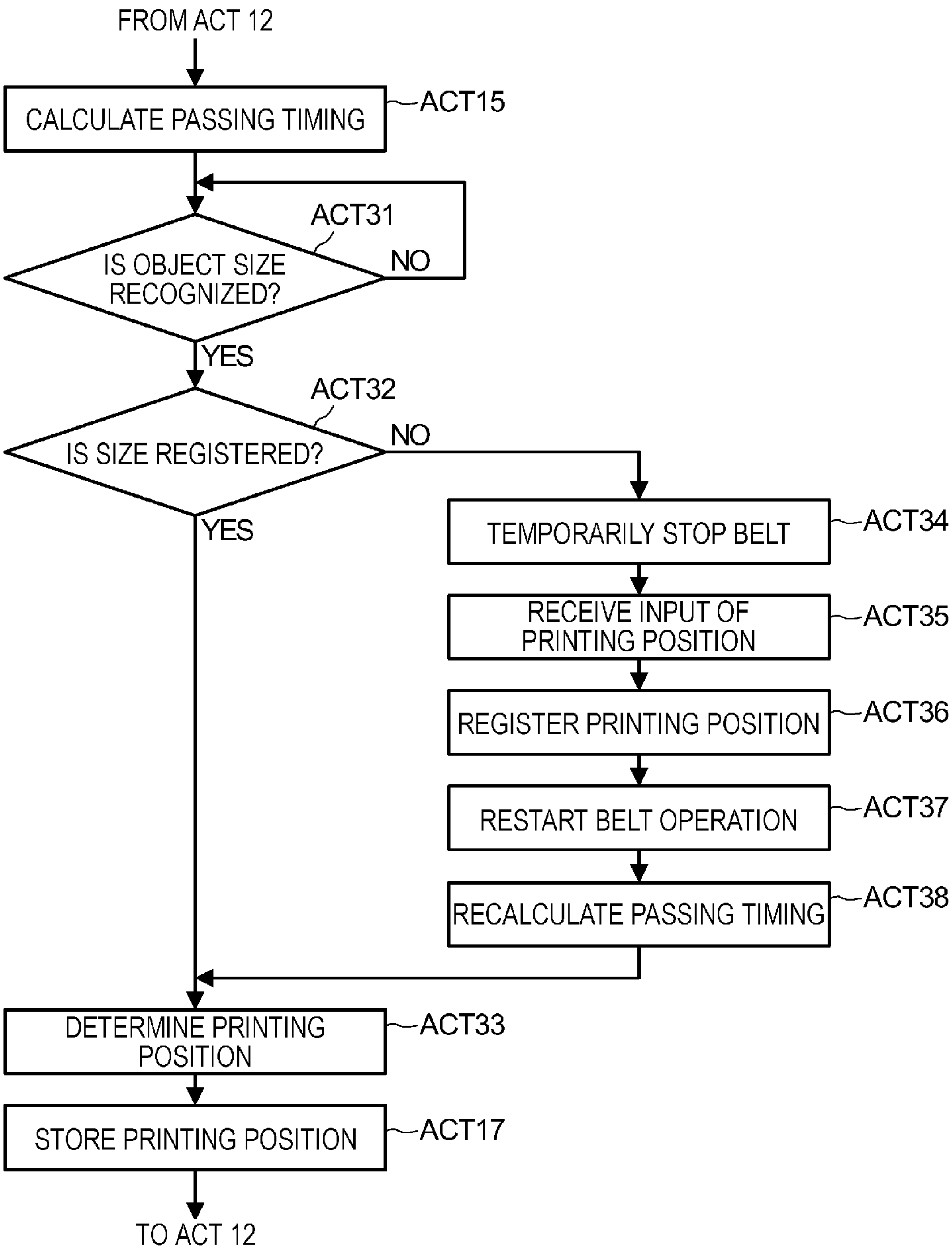
FIG. 13 is a flowchart showing an example of the control operation of the control unit in FIG. 6.

FIG. 13 is a flowchart showing an example of a control operation of the control unit 11. Here, a part different from the control operation of the first embodiment is specified and described. It is assumed that the size and printing position of the object to be printed OB are already registered in the table of the object to be printed 1142 of the storage 114, and description of a registration operation thereof will be omitted.

In ACT 15 as described in the first embodiment, after calculating the passing timing at which the object to be printed OB passes through each process position, the CPU 111 in the second embodiment determines whether or not the size of the object to be printed OB is recognized by a signal from the object sensor 21 input via the sensor circuit 116 (ACT 31). When determining that the size of the object to be printed OB cannot be recognized (ACT 31, NO), the CPU 111 repeats the process of ACT 31.

When determining that the size of the object to be printed OB is recognized (ACT 31, YES), the CPU 111 determines whether or not the size of the recognized object to be printed OB is registered in the table of the object to be printed 1142 of the storage 114 (ACT 32). When determining that the corresponding size thereof is registered in the table of the object to be printed 1142 (ACT 32, YES), the CPU 111 determines that the printing position registered as the printing position of the corresponding size in the table of the object to be printed 1142 is the printing position on the printing surface of the object to be printed OB (ACT 33). Next, the CPU 111 stores the determined printing position in the RAM 113 (ACT 17). After that, the CPU 111 proceeds to the process of ACT 12.

On the other hand, when determining that the corresponding size thereof is not registered in the table of the object to be printed 1142 (ACT 32, NO), the CPU 111 controls the belt motor 19 by the motor drive circuit 118 to temporarily stop the operation of the conveyance belt BE (ACT 34). Next, the CPU 111 receives an input of the printing position by the user interface 17 from the operator (ACT 35). The CPU 111 registers the input printing position in the table of the object to be printed 1142 in association with a new setting ID (ACT 36). After that, the CPU 111 controls the belt motor 19 by the motor drive circuit 118 to restart the operation of the conveyance belt BE (ACT 37). The CPU 111 recalculates the passing timing at which each object to be printed OB passes through each process position according to the time when the conveyance belt BE is temporarily stopped, and stores the recalculated passing timing in the RAM 113 (ACT 38). After that, the CPU 111 proceeds to the process of ACT 33.

As described above, the printing system 10 according to the second embodiment includes the object sensor 21 which is a size measurement sensor for measuring the height and width of the object to be printed OB conveyed by the conveyance belt BE, instead of the label sensor 13. The CPU 111 functions as a calculation unit that calculates the printing position based on the height and width of the object to be printed OB.

Accordingly, it is possible to provide the printing system 10 that can efficiently rewrite the printing information of the objects to be printed OB without the label LA, which are conveyed one after another.

Third Embodiment

Next, the third embodiment will be described. The third embodiment is a combination of the first embodiment and the second embodiment. That is, both the label sensor 13 and the object sensor 21 are disposed between the timing sensor 12 and the heater 14 in this order. Both the label sensor 13 and the object sensor 21 are connected to the sensor circuit 116 of the control unit 11.

Figure 14:
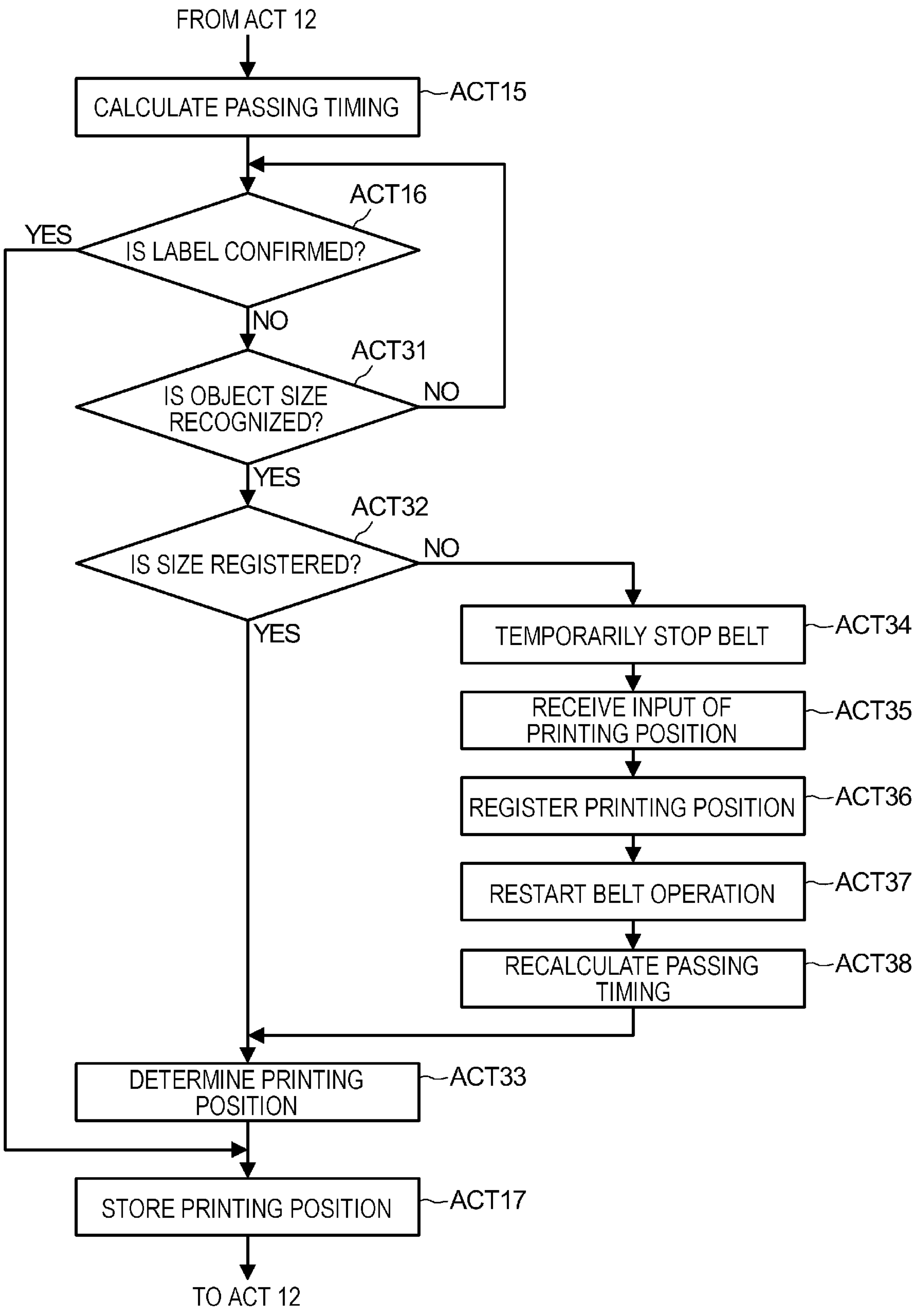
FIG. 14 is a flowchart showing an example of a control operation of a control unit of a printing system according to a third embodiment.

FIG. 14 is a flowchart showing an example of the control operation of the control unit 11 of the printing system 10 according to the third embodiment, and shows a part corresponding to FIG. 13 in the second embodiment. After calculating the passing timing at which the object to be printed OB passes through each process position in ACT 15, the CPU 111 of this embodiment, as described in the first embodiment, determines whether or not the label LA, that is, the printing position in the object to be printed OB is confirmed based on a signal from the label sensor 13 (ACT 16). Next, when determining that the label LA is not confirmed (ACT 16, NO), the CPU 111 determines whether or not the size of the object to be printed OB is recognized based on a signal from the object sensor 21 (ACT 31). When determining that the size of the object to be printed OB cannot be recognized (ACT 31, NO), the CPU 111 proceeds to the process of ACT 16. In this manner, the CPU 111 repeats the process of ACT 16 and the process of ACT 31, and waits for the printing position or the size of the object to be printed OB to be acquired.

Next, when determining that the label LA is confirmed (ACT 16, YES), the CPU 111 proceeds to the process of ACT 17.

When determining that the size of the object to be printed OB is recognized (ACT 31, YES), the CPU 111 proceeds to the process of ACT 32.

As described above, in this embodiment, it is possible to provide the printing system 10 that can efficiently rewrite the printing information for both the object to be printed OB in which the printing information is printed on the label LA, and the object to be printed OB in which the printing information is printed directly thereon.

Other Embodiments

Figure 15:
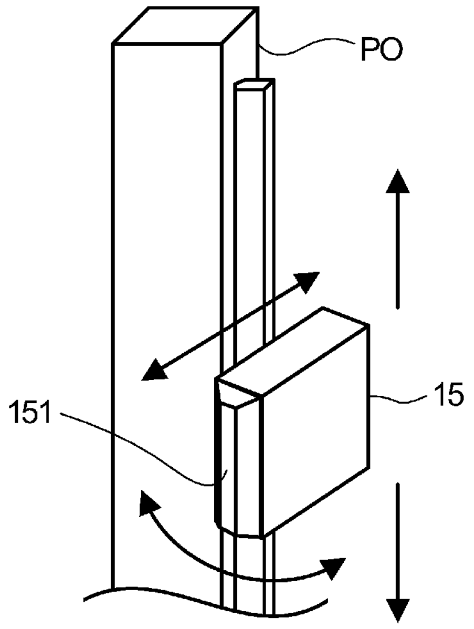
FIG. 15 is a schematic diagram showing a position and a posture adjustment operation of the printer for causing the object to be printed to face a printer head.

Each of the embodiments describes an example in which the butt plate BP and the pressing plate PP are used as the facing mechanism for causing the printing surface of the object to be printed OB to face the printer head 151 of the printer 15 at least at the printing process position, but the facing mechanism is not limited to such a configuration. FIG. 15 is a schematic diagram showing a position and posture adjustment operation of the printer 15 for causing an object to be printed to face the printer head 151. For example, if the object sensor 21 as described in the second embodiment is used, it is possible to determine a placement position and posture of the object to be printed OB diagonally placed on the conveyance belt BE, that is, at what position the object to be printed OB is placed from the end portion on the printer 15 side of the conveyance belt BE, and at what angle the object to be printed OB is diagonally placed thereon. Therefore, it is assumed that the facing mechanism is configured to be able to change not only a height position as shown by a solid arrow in FIG. 15, but also a direction and distance of the printer head 151 of the printer 15 with respect to the object to be printed OB as shown by a solid double-headed arrow. In such a facing mechanism, the distance and angle of the printer head 151 with respect to the object to be printed OB are adjusted depending on the placement position and posture of the determined object to be printed OB, thereby making it possible to cause the printing surface of the object to be printed OB to face the printer head 151 of the printer 15.

The barcode reader is further added in front of the heater 14 in the conveyance direction to read the printing information printed on the object to be printed OB, and the printing information to be newly printed may be specified based on a content of the printing information. FIG. 16 is a diagram showing another example of the writing information stored in the temporary storage unit 1131 of the RAM 113. In this manner, the writing information is stored in association with the object ID and the object information of the object to be printed OB being stored in the database 1141 of the storage 114. That is, the printing information already printed on the object to be printed OB and the writing information to be newly rewritten are associated with each other and stored in the temporary storage unit 1131. As a result, the CPU 111 can easily and accurately acquire the writing information to be printed instead of the printing information printed on the object to be printed OB. Accordingly, it is possible to eliminate the limitation that the writing information is stored in the temporary storage unit 1131 in consideration of the order in which printing should be performed, and the object to be printed OB is required to be placed on the conveyance belt BE in this order as described in each of the embodiments, thereby improving usability.

The order of processes shown in the flowcharts of FIGS. 9, 13, and 14 is an example, and is not limited thereto. As long as there is no discrepancy occurring between the previous and subsequent processes, each process may be performed by changing the order thereof, or may be performed in parallel.

In each of the embodiments, when calculating the passing timing at which the object to be printed OB passes through each process position in ACT 15, the conveyance speed of the object to be printed OB is calculated. However, if the CPU 111 controls the belt motor 19 by the motor drive circuit 118 so that the conveyance speed thereof becomes a predetermined constant speed, the calculation of the conveyance speed becomes unnecessary. In this case, since the distance from the timing sensor 12 to each process position does not change, a constant based on the movement speed and the distance is obtained and stored non-volatilely in the ROM 112 or the storage 114, thereby making it possible to simply calculate the passing timing of the object to be printed OB from the arrival timing of the timing sensor 12.

If the arrival at each process position is configured to be individually detected by a sensor, the operation timing of each process can be controlled independently, such that the arrangement position of the pressing plate PP in the first embodiment is not particularly limited. In this case, the pressing plate PP may be installed at a plurality of places.

If a camera is provided instead of the barcode reader 16 and the content of the printing information is determined by character recognition, it may not be required to print the two-dimensional code as the printing information.

A conveyance machine for conveying the object to be printed OB may have any configuration other than that of the conveyance belt BE, such as rollers consecutively disposed adjacent to each other.

The functions described in each of the embodiments are not limited to being configured by using hardware, and can also be implemented by allowing a computer to read a program describing each function by using software. Each function may be configured by appropriately selecting either software or hardware.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printing system, comprising:

a conveyance machine configured to convey an object to be printed;

a position determination component configured to determine a printing position of printing information that is printed using thermochromic ink on the object to be printed conveyed by the conveyance machine;

an erasing component including a heat source, configured to erase the printing information that is printed using the thermochromic ink on the printing position by emitting heat from the heat source, a height position of which is adjusted according to the printing position, from a direction perpendicular to a conveyance direction of the object to be printed by the conveyance machine, according to a timing at which the printing position, determined based on the printing position, passes;

a printing component including a printer using the thermochromic ink, disposed behind the heat source of the erasing component along the conveyance direction, configured to print information on the object to be printed from the direction perpendicular to the conveyance direction by the printer, a height position of which is adjusted according to the printing position, according to the timing at which the printing position, determined based on the printing position, passes; and a facing mechanism configured to cause a printing surface including the printing position of the object to be printed to face a printer head of the printer at least when the printing component prints the information, wherein the conveyance machine includes a conveyance belt that conveys the object to be printed placed thereon in the conveyance direction, and the printer head of the printer is provided toward the direction perpendicular to the conveyance direction, and the facing mechanism includes a butt plate extending along the conveyance belt of the conveyance machine up to at least an installation position of the printer, and having a surface rising on the conveyance belt side at a specified distance from the printer head, and a pressing mechanism configured to press the object to be printed against the butt plate disposed in front of the printer installation position in the conveyance direction.

2. The printing system according to claim 1, wherein the position determination component includes a printing position detector configured to detect the printing position in the object to be printed being conveyed by the conveyance machine.

3. The printing system according to claim 1, wherein the position determination component includes a size measurement sensor configured to measure a height and width of the object to be printed being conveyed by the conveyance machine, and a calculation component configured to calculate the printing position based on the height and width of the object to be printed.

4. The printing system according to claim 1, wherein the conveyance machine includes a conveyance belt that conveys the object to be printed placed thereon in the conveyance direction, and the facing mechanism includes a position and posture detector configured to detect a position and posture of the object to be printed placed on the conveyance belt, and an adjustment component configured to adjust a direction of the printer head and a distance between the printer head and the printing surface of the object to be printed according to the position and posture of the object to be printed.

5. The printing system according to claim 1, wherein the printer is a barcode printer.

6. The printing system according to claim 1, further comprising:

determining whether or not an erasing operation is completed.

7. A printing method, comprising:

conveying an object to be printed;

determining a printing position of printing information that is printed using thermochromic ink on the object to be printed conveyed by the conveying;

erasing, using a heat source, the printing information that is printed using the thermochromic ink on the printing position by emitting heat from the heat source, a height position of which is adjusted according to the printing position, from a direction perpendicular to a conveyance direction of the object to be printed by the conveying, according to a timing at which the printing position, determined based on the printing position, passes;

printing information, using the thermochromic ink, disposed behind the heat source, on the object to be printed from the direction perpendicular to the conveyance direction, a height position of which is adjusted according to the printing position, according to the timing at which the printing position, determined based on the printing position, passes;

causing a printing surface including the printing position of the object to be printed to face a printer head at least when printing the information;

conveying, using a conveyance belt, the object to be printed placed thereon in the conveyance direction; and pressing the object to be printed against a butt plate extending along the conveyance belt up to at least an installation position of the printer and disposed in front of a printer installation position in the conveyance direction.

8. The printing method according to claim 7, further comprising:

detecting the printing position in the object to be printed being conveyed by the conveying.

9. The printing method according to claim 7, further comprising:

measuring a height and width of the object to be printed being conveyed by the conveying; and calculating the printing position based on the height and width of the object to be printed.

10. The printing method according to claim 7, further comprising:

detecting a position and posture of the object to be printed placed on a conveyance belt; and adjusting a direction of the printer head and a distance between the printer head and the printing surface of the object to be printed according to the position and posture of the object to be printed.

11. The printing method according to claim 7, further comprising:

determining whether or not an erasing operation is completed.

12. A printing device, comprising:

a position determination component configured to determine a printing position of printing information that is printed using thermochromic ink on an object to be printed conveyed by a conveyance machine;

an erasing component including a heat source, configured to erase the printing information that is printed using the thermochromic ink on the printing position by emitting heat from the heat source, a height position of which is adjusted according to the printing position, from a direction perpendicular to a conveyance direction of the object to be printed by the conveyance machine, according to a timing at which the printing position, determined based on the printing position, passes;

a printing component using the thermochromic ink, disposed behind the heat source of the erasing component along the conveyance direction, configured to print information on the object to be printed from the direction perpendicular to the conveyance direction, a height position of which is adjusted according to the printing position, according to the timing at which the printing position, determined based on the printing position, passes, wherein the position determination component includes a size measurement sensor configured to measure a height and width of the object to be printed being conveyed by the conveyance machine, and a calculation component configured to calculate the printing position based on the height and width of the object to be printed.

13. The printing device according to claim 12, wherein the position determination component includes a printing position detector configured to detect the printing position in the object to be printed being conveyed by the conveyance machine.

14. The printing device according to claim 12, wherein the conveyance machine includes a conveyance belt that conveys the object to be printed placed thereon in the conveyance direction, and the printer head of the printing component is provided toward the direction perpendicular to the conveyance direction, and a pressing mechanism configured to press the object to be printed against a butt plate disposed in front of the printer installation position in the conveyance direction.

15. The printing device according to claim 12, wherein the conveyance machine includes a conveyance belt that conveys the object to be printed placed thereon in the conveyance direction, and further comprising:

an adjustment component configured to adjust a direction of the printer head and a distance between the printer head and the printing surface of the object to be printed according to the position and posture of the object to be printed.

16. The printing device according to claim 12, wherein the printing component is a barcode printer.

17. The printing device according to claim 12, further comprising:

determining whether or not an erasing operation is completed.

* * * * *